US008117194B2

(12) United States Patent
Zhao et al.

(10) Patent No.: US 8,117,194 B2
(45) Date of Patent: Feb. 14, 2012

(54) METHOD AND SYSTEM FOR PERFORMING MULTILINGUAL DOCUMENT SEARCHES

(75) Inventors: Lei Zhao, Sammamish, WA (US);
Ashutosh Galande, Bellevue, WA (US);
Richard Critchlow, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 771 days.

(21) Appl. No.: 11/745,104

(22) Filed: May 7, 2007

(65) Prior Publication Data

US 2008/0281804 A1    Nov. 13, 2008

(51) Int. Cl.
*G07F 7/08* (2006.01)
(52) U.S. Cl. .......................................... 707/723; 707/724
(58) Field of Classification Search ........................ None
See application file for complete search history.

(56) References Cited

U.S. PATENT DOCUMENTS

| | | | | |
|---|---|---|---|---|
| 5,787,410 A * | 7/1998 | McMahon | ........................ | 707/1 |
| 5,956,740 A * | 9/1999 | Nosohara | ........................ | 715/264 |
| 6,006,221 A * | 12/1999 | Liddy et al. | ........................ | 707/5 |
| 6,064,951 A | 5/2000 | Park et al. | ........................ | 704/8 |
| 6,212,537 B1 | 4/2001 | Nosohara | ........................ | 707/536 |
| 6,263,329 B1 | 7/2001 | Evans | ........................ | 707/3 |
| 6,360,196 B1 * | 3/2002 | Poznanski et al. | ................ | 704/8 |
| 6,389,387 B1 * | 5/2002 | Poznanski et al. | ................ | 704/9 |
| 6,604,101 B1 * | 8/2003 | Chan et al. | ........................ | 707/4 |
| 6,952,691 B2 * | 10/2005 | Drissi et al. | ........................ | 707/3 |
| 7,146,358 B1 | 12/2006 | Gravano et al. | ................ | 707/5 |
| 7,373,341 B2 * | 5/2008 | Polo-Malouvier | ................ | 707/3 |
| 7,523,108 B2 * | 4/2009 | Cao | ........................ | 707/5 |
| 7,711,682 B2 * | 5/2010 | Zhang | ........................ | 707/771 |
| 7,743,048 B2 * | 6/2010 | Baldwin | ........................ | 707/713 |
| 7,844,590 B1 * | 11/2010 | Zwicky et al. | ................ | 707/706 |
| 7,966,337 B2 * | 6/2011 | Blackman et al. | ............ | 707/752 |
| 7,974,972 B2 * | 7/2011 | Cao | ........................ | 707/724 |
| 2001/0016860 A1 * | 8/2001 | Nosohara | ........................ | 707/536 |
| 2002/0111792 A1 * | 8/2002 | Cherny | ........................ | 704/8 |
| 2002/0193986 A1 * | 12/2002 | Schirris | ........................ | 704/8 |
| 2006/0059132 A1 * | 3/2006 | Zhang | ........................ | 707/3 |

(Continued)

OTHER PUBLICATIONS

Lin, Chin-Yew, "Machine Translation for Information Access across the Language Barrier: the MuST System," Machine Translation Summitt VII, Sep. 13-17, 1999, Singapore, 9 pages, http://research.microsoft.com/~cyl/download/papers/MuST-MT-Summit-VII-final.pdf.

(Continued)

*Primary Examiner* — Hung Q Pham
*Assistant Examiner* — Hubert Cheung
(74) *Attorney, Agent, or Firm* — Merchant & Gould P.C.

(57) ABSTRACT

Multilingual document searches are performed by ordering and filtering localized documents in different languages based on user preferences. Documents are indexed in a global search engine index using an identifier property and a language property permitting all relevant documents to be retrieved in a single search engine query. By storing documents with their identifier and language properties, documents from different cultures but with same content can be treated as equivalent. Results of the initial search include a multilingual set of documents ranked in order of relevance. Result sets are then post-processed using a data resource indicating for each multilingual user interface combination, which language version of each document should be returned. The initial search result are then transformed into a relevance based ordered list treating documents in different languages having same content as equivalent. Based on the ordered list, a final document list is prepared using localized and non-localized content.

19 Claims, 5 Drawing Sheets

U.S. PATENT DOCUMENTS

| | | | | |
|---|---|---|---|---|
| 2006/0173886 | A1* | 8/2006 | Moulinier et al. | 707/101 |
| 2006/0242621 | A1* | 10/2006 | Ye et al. | 717/105 |
| 2007/0016575 | A1* | 1/2007 | Hurst-Hiller et al. | 707/5 |
| 2009/0125497 | A1* | 5/2009 | Jiang et al. | 707/4 |
| 2010/0257160 | A1* | 10/2010 | Cao | 707/723 |
| 2010/0287049 | A1* | 11/2010 | Rousso et al. | 705/14.53 |

OTHER PUBLICATIONS

Capstick, Joanne, et al., "MULINEX: Multilingual Web Search and Navigation," Proceedings of the 14$^{th}$ Twente Workshop in Language Technology (TWLT14), Language Technology in Multimedia Information Retrieval, Dec. 7-8, 1998, University of Twente, Enchede, The Netherlands, 7 pages, http://www.coli.uni-saarland.de/publikationen/softcopies/Capstick:1998:MMWb.pdf.

"References of Joanne Capstick," Publication Database References, (date of publication source for article "MULINEX: Multilingual Web Search and Navigation," above), http://www.coli.uni-saarland.de/publications/show.php?author=Joanne_Capstick, 1998.

Wechsler, Martin, et al., "Multi-Language Text Indexing for Internet Retrieval," Third Delos Workshop, Cross-Language Information Retrieval, Zurich, Switzerland; Mar. 5-7, 1997, http://www.iei.pi.cnr.it/ErcimDL/third-DELOS-workshop/Sheridan/sheridan-delos/riao97.ps.gz.

"Third Delos Workshop, Cross-Language Information Retrieval," Zurich, Switzerland; (date of publication source for article "Multi-Language Text Indexing for Internet Retrieval," above), Mar. 5-7, 1997,http://www.iei.pi.cnr.it/ErcimDL/third-DELOS-workshop, 2 pages.

* cited by examiner

METHOD AND SYSTEM FOR PERFORMING MULTILINGUAL DOCUMENT SEARCHES

BACKGROUND

Characteristics of different human languages can affect the design of software. In today's networked environments national boundaries are disappearing rapidly, but the existence of different languages presents a challenge to application designers that may have to accommodate multiple language documents, user preferences, and so on. The process of creating an application that is useful to many different users with different locales and languages is called software internationalization. Such an application requires localization to customize it to the supported locales and languages.

In the global market place partial, localization of products is a successful strategy for smaller markets. Software products with some parts of their user interfaces localized are attractive to users while still being sufficiently inexpensive to justify their purchase. This is called a Multilingual User Interface (MUI).

The impact of this strategy on service providers includes a need to support document sets that are only partially localized. This may be addressed by supplementing the localized documents with documents from other languages. The combination of localized documents for a variety of products in a service platform presents a challenge when users are to be presented with desired documents (e.g. in a product support platform) and each user may have a different language preference.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to ordering and filtering localized documents in different languages based on user preferences. According to one embodiment, documents may be identified using an identifier property and a language property such that documents in different languages can be indexed by a search engine, then filtered and sorted when a search query from a user is being performed. The ordered result list may then be provided to the requesting user based on the user's language preferences.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, localized documents in different languages may be ordered and filtered in response to a user requested search based on user preferences. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described, in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
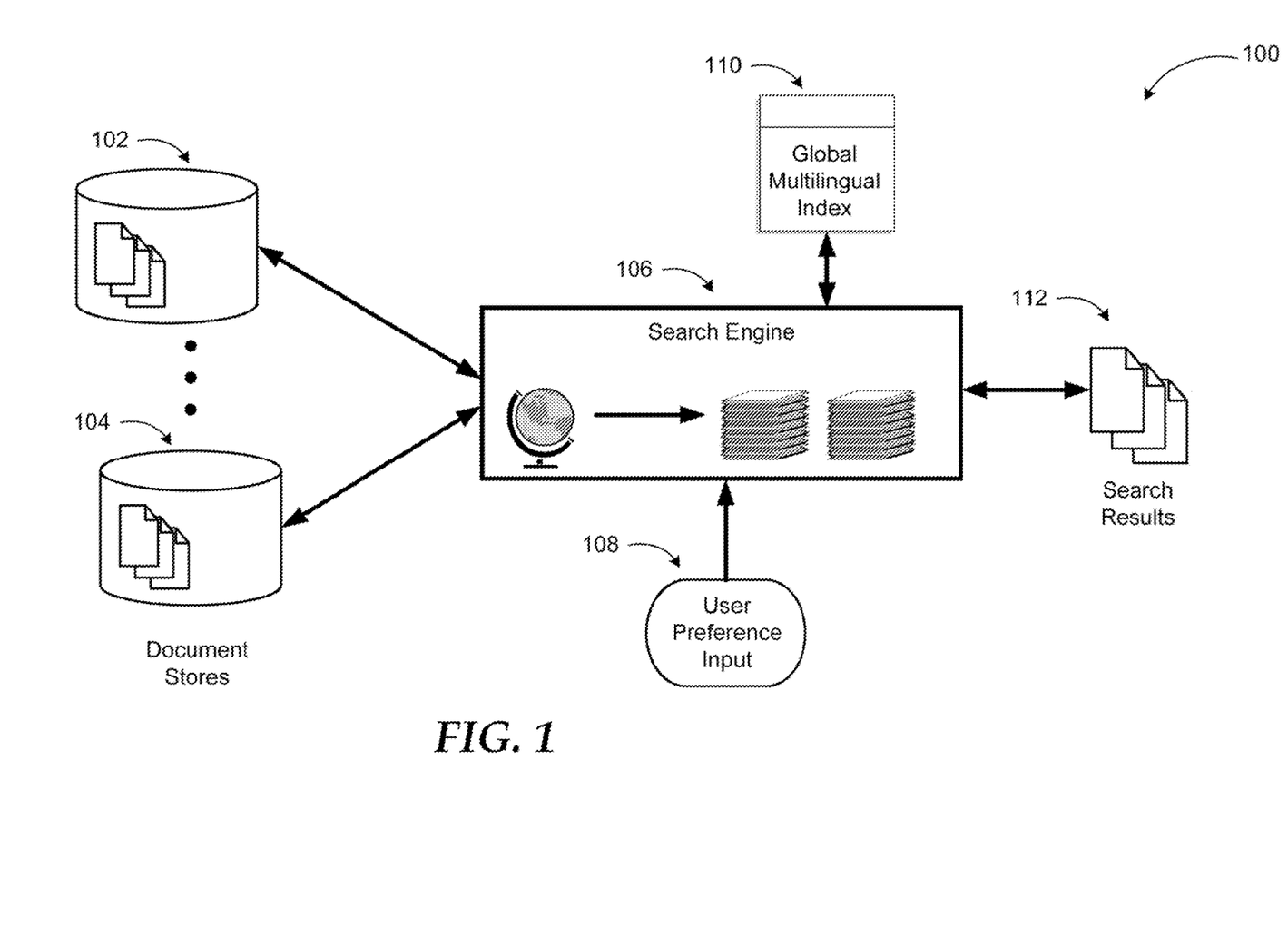
FIG. 1 illustrates an example multilingual document search system.

Referring to FIG. 1, an example multilingual document search system 100 is illustrated. Multilingual document search systems may be implemented in a variety of ways ranging from simple search applications to complicated service platforms. For example, a customer support service of a computer products company may host a web-based service that provides users documentation for a variety of hardware and software products. Each product may be provided by a different manufacturer with the documents being stored in different data stores and having varying multilingual versions. To add to the complexity, user access to the documents may be controlled based on user permission levels such as licensing of products, etc.

In a service platform according to embodiments, each document may be identified with an identifier property and a language property. This way, the different language versions of the same document can be easily recognized, as they will have the same identifier but different languages. Then, the documents in different languages may be indexed in a global search engine index permitting all the relevant documents to be retrieved in a single search engine query. The results may be limited to those in the languages of the desired MUI combination by filtering on a list of localizations specified at the query time.

The results of the initial search include a multilingual set of documents ranked in order of relevance. However, the set may contain versions of the same document in different languages. The set of results may then be post-processed using a data resource indicating for each MUI combination, which language version of each document should be returned. An algorithm according to other embodiments may support processing search results from multiple search sources and may combine them to return more relevant results.

Before a final list of documents is prepared, the search results may be validated against the document store to ensure that there are no discrepancies between the search index and the documents stored in service platform document store. During this validation, the documents that are returned as relevant may be validated regardless of their culture. This ensures that even if a non-localized document was ranked higher in the search result, it can later be replaced by its localized counterpart.

The initial search result may then be transformed into a relevance based ordered list. While generating this list, documents in different languages having same content may be considered equivalent. The list serves as the basis of preparing a final result set. Based on the ordered list, the final document list may be prepared using the localized and non-localized content. While preparing this list, a fallback strategy may be used select a document so that if a localized content is not available, a non-localized one is returned. The fallback localization order may be arbitrary or based on a predefined order.

In the example system of FIG. 1, search engine 106 is configured to receive user preference input for language 108 along with a search request. According to some embodiments, the user preferences may be provided by other mechanisms such as detection of user interface language, stored user preferences, geographic determination, and so on.

The search engine then performs the search by submitting the query to one or more document stores (102, 104, and the like). Using the global multilingual index 110, the results are processed as described above and the final search result set 112 provided to the user.

A system according to embodiments is not limited to the example system and its components described above. Searching multilingual documents based on user language preferences may be implemented with fewer or additional components performing additional or fewer tasks using the principles described herein.

Figure 2:
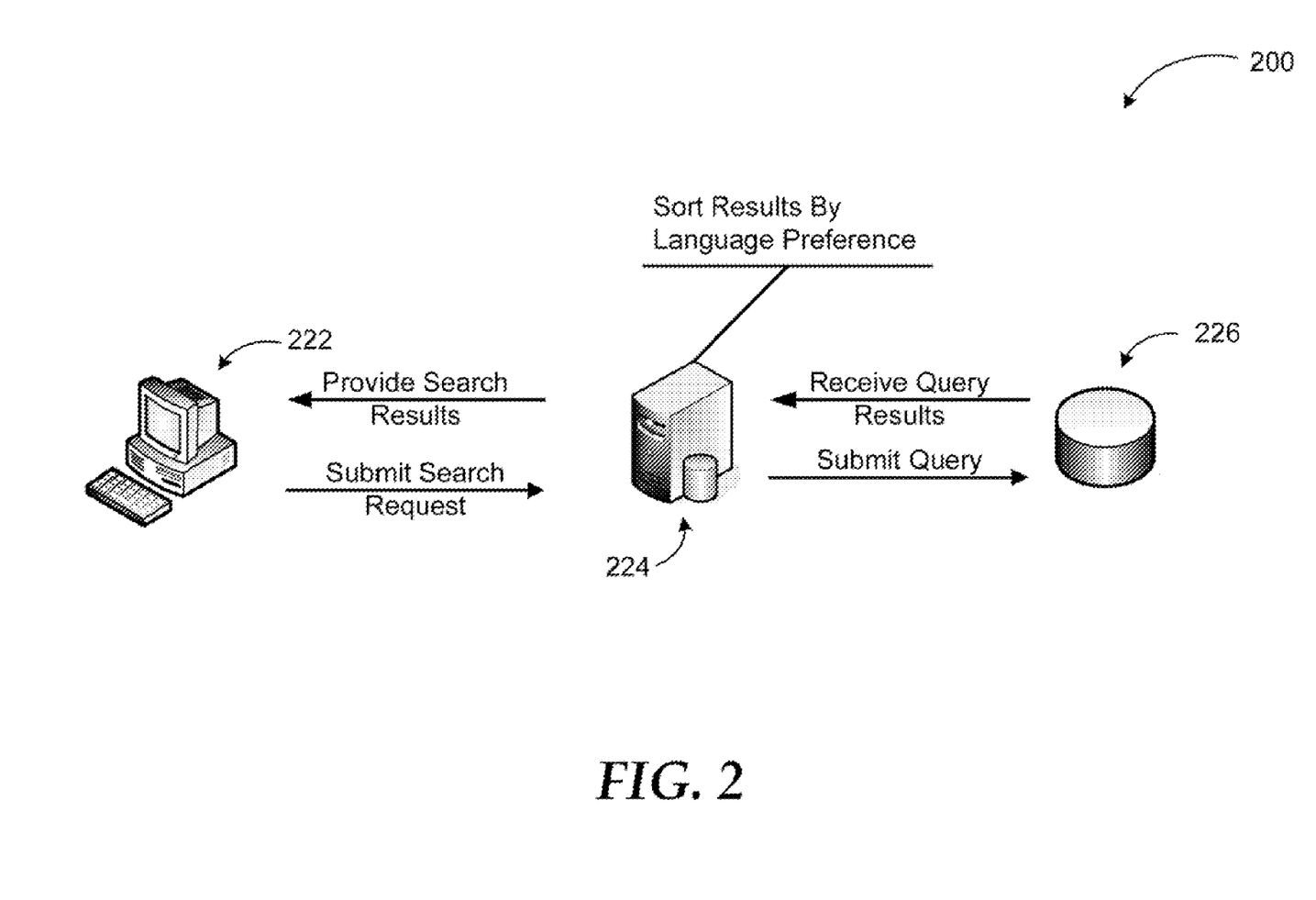
FIG. 2 illustrates example interactions between a client and a document search service providing multilingual filtering and ordering based on user preferences according to embodiments.

FIG. 2 illustrates example interactions between a client and a document search service providing multilingual filtering and ordering based on user preferences according to embodiments.

The combination of documents in various languages supplemented with localized documents for a variety of products may be called a MUI combination. The localized language in the combination may be called the primary language and the other languages in the combination the secondary (tertiary, quaternary . . . ) languages.

When searching a MUI combination document set, it may be desired that the search solution return the documents in order from most relevant to least and return only one version of each document (the version in the primary language, if available). If the version in primary language is not available, a version in the secondary language, (otherwise, a version in the tertiary language, etc.) may be provided.

Example interactions may begin with a user submitting a search request through client 222 to a service platform (represented, by server 224), which may utilize a global search engine index for sorting documents identified with an identifier property and a language property. The index may include mostly documents from different languages including the ones specified by the desired MUI combination.

The search engine running on the server 224 may submit the query to one or more data stores represented by database 226 and receive query results. The results of the initial search may include a multilingual set of documents ranked in order of relevance, but also versions of the same document in different languages. The search engine may also post-process the set of results using a data resource indicating for each MUI combination, which language version of each document is to be returned.

The search engine may then transform the initial query results into a relevance based ordered list. While generating this list, documents in different languages having same content may be considered equivalent. The list serves as the basis of preparing a final result set. Based on the ordered list, the final document list may be prepared using the localized and non-localized content and provided to client 222.

While specific sorting and filtering techniques are used and described, a system according to embodiments is not limited to the definitions and examples described above. Performing a document search in a multilingual platform based on user language preferences may be provided using additional or fewer steps and techniques.

Figure 3:
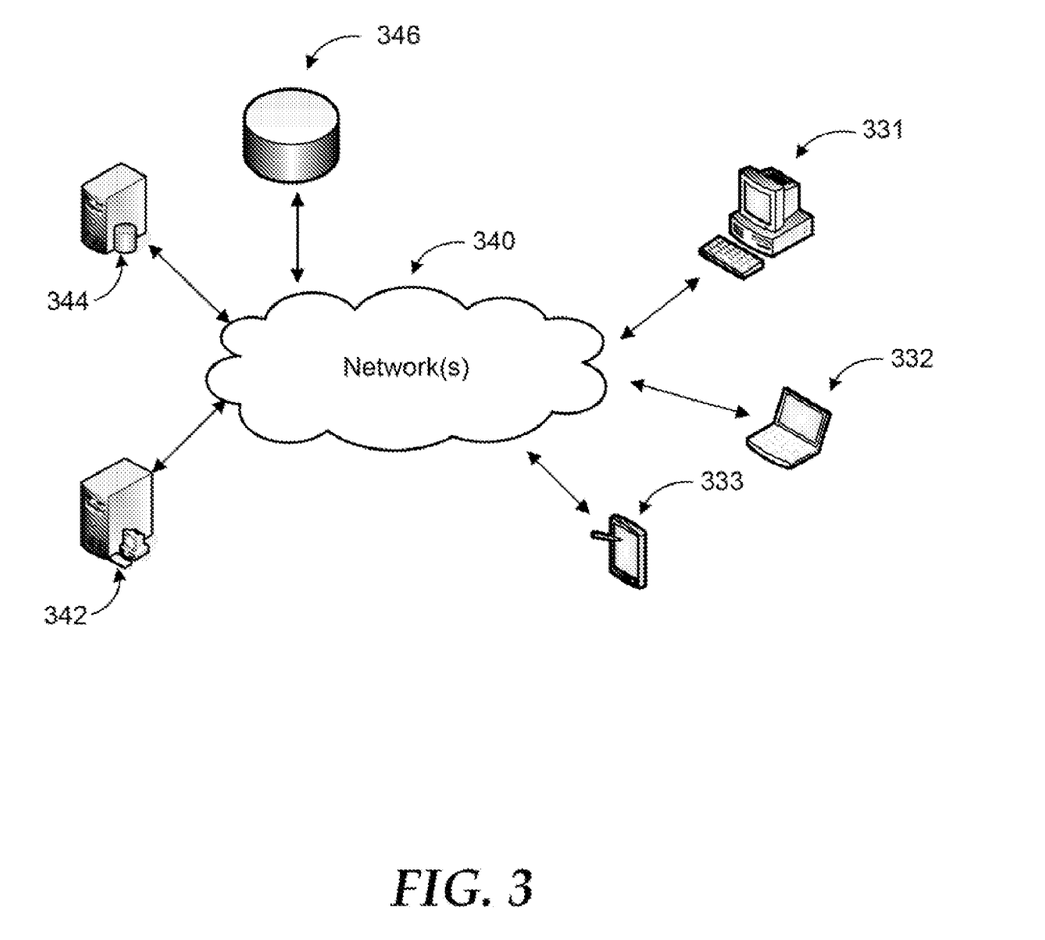
FIG. 3 is an example networked environment, where embodiments may be implemented.

FIG. 3 is an example networked environment, where embodiments may be implemented. Mixed language search systems may be implemented locally on a single computing device or in a distributed manner over a number of physical and virtual clients and servers. They may also be implemented in un-clustered systems or clustered systems employing a number of nodes communicating over one or more networks (e.g. network(s) 340).

Such a system may comprise any topology of servers, clients, Internet service providers, and communication media. Also, the system may have a static or dynamic topology. The term "client" may refer to a client application or a client device. While a networked system implementing mixed language search system based on user language preferences may involve many more components, relevant ones are discussed in conjunction with this figure.

A multilingual document search engine according to embodiments may be implemented as part of a service platform in individual client devices 331-333 or executed in server 342 and accessed from anyone of the client devices (or applications). Data stores associated with providing multilingual documents may be embodied in a single data store such as data store 346 or distributed over a number of data stores associated with individual client devices, servers, and the like. Dedicated database servers (e.g. database server 344) may be used to coordinate data retrieval and storage in one or more of such data stores.

Network(s) 340 may include a secure network such as an enterprise network, an unsecure network such as a wireless open network, or the Internet. Network(s) 340 provide communication between the nodes described herein. By way of example, and not limitation, network(s) 340 may include wired media such as a wired network or direct-wired connection, and wireless media such as acoustic, RF, infrared and other wireless media.

Many other configurations of computing devices, applications, data sources, data distribution systems may be employed to implement multilingual document searching based on user language preferences. Furthermore, the networked environments discussed in FIG. 3 are for illustration purposes only. Embodiments are not limited to the example applications, modules, or processes.

Figure 4:
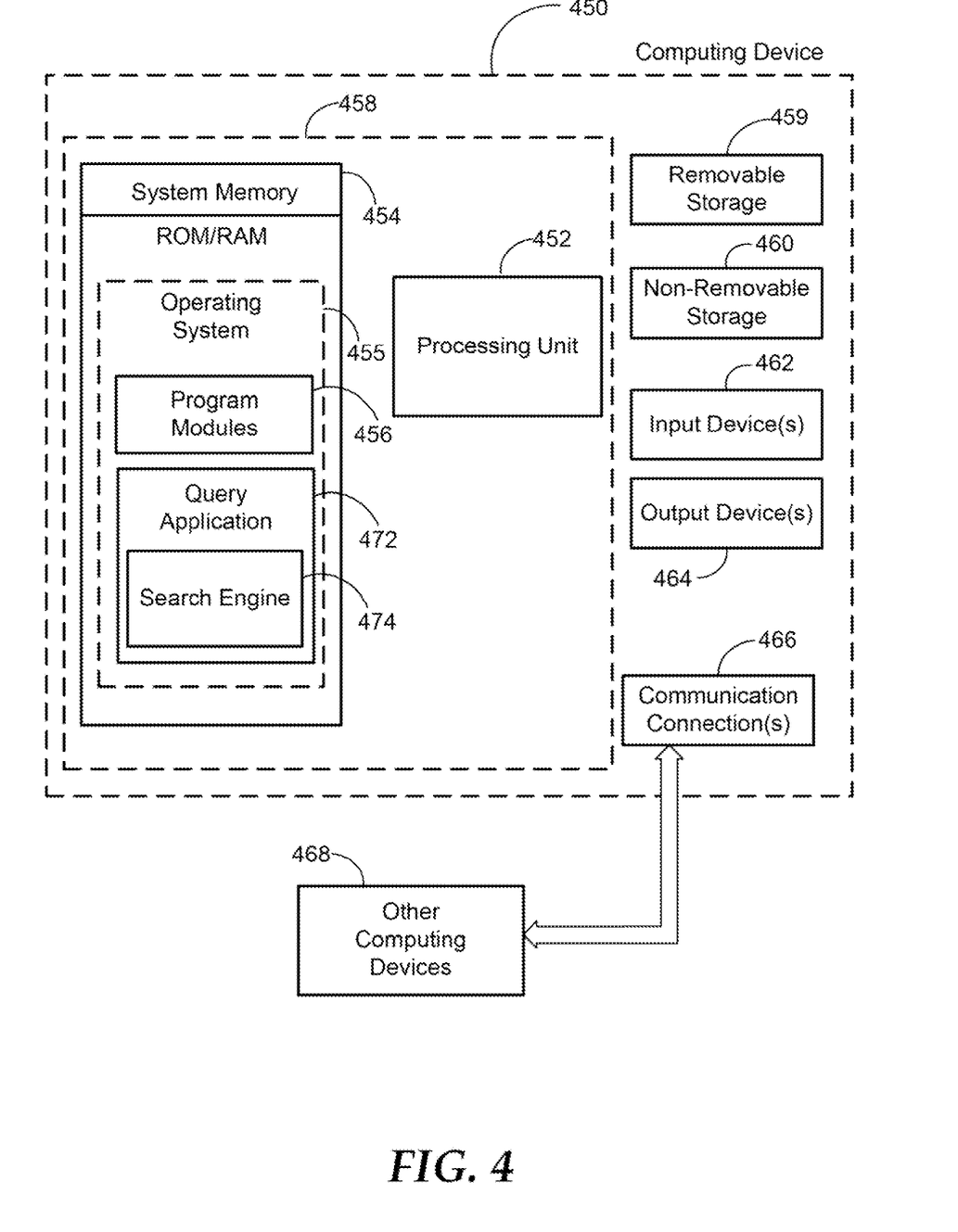
FIG. 4 is a block diagram of an example computing operating environment, where embodiments may be implemented.

FIG. 4 and the associated discussion are intended to provide a brief, general description of a suitable computing environment in which embodiments may be implemented. With reference to FIG. 4, a block diagram of an example computing operating environment is illustrated, such as computing device 450. In a basic configuration, the computing device 450 may be a server providing document search service and typically include at least one processing unit 452 and system memory 454. Computing device 450 may also include a plurality of processing units that cooperate in executing programs. Depending on the exact, configuration and type of computing device, the system memory 454 may be volatile (such as RAM), non-volatile (such as ROM, flash memory, etc.) or some combination of the two. System memory 454 typically includes an operating system 455 suitable for controlling the operation of a networked personal computer, such as the WINDOWS® operating systems from MICROSOFT CORPORATION of Redmond, Wash. The system memory 454 may also include one or more software applications such as program modules 456, query application 472, and search engine 474.

Query application 472 may be a separate application or an integral module of a service platform that provides other services to clients associated with computing device 450. Search engine 476 may perform document searches sorting multilingual documents based on user language preferences, as described previously. This basic configuration is illustrated in FIG. 4 by those components within dashed line 458.

The computing device 450 may have additional features or functionality. For example, the computing device 450 may also include additional data storage devices (removable and/or non-removable) such as, for example, magnetic disks, optical disks, or tape. Such additional storage is illustrated in FIG. 4 by removable storage 459 and non-removable storage 460. Computer storage media may include volatile and non-volatile, removable and non-removable media implemented in any method or technology for storage of information, such as computer readable instructions, data structures, program modules, or other data. System memory 454, removable storage 459 and non-removable storage 460 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 450. Any such computer storage media may be part of device 450. Computing device 450 may also have input device(s) 462 such as keyboard, mouse, pen, voice input device, touch input device, etc. Output device(s) 464 such as a display, speakers, printer, etc. may also be included. These devices are well known in the art and need not be discussed at length here.

The computing device 450 may also contain communication connections 466 that allow the device to communicate with other computing devices 468, such as over a wireless network in a distributed computing environment, for example, an intranet or the Internet. Other computing devices 468 may include server(s) that provide access to document stores, user information, and so on. Communication connection 466 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 5:
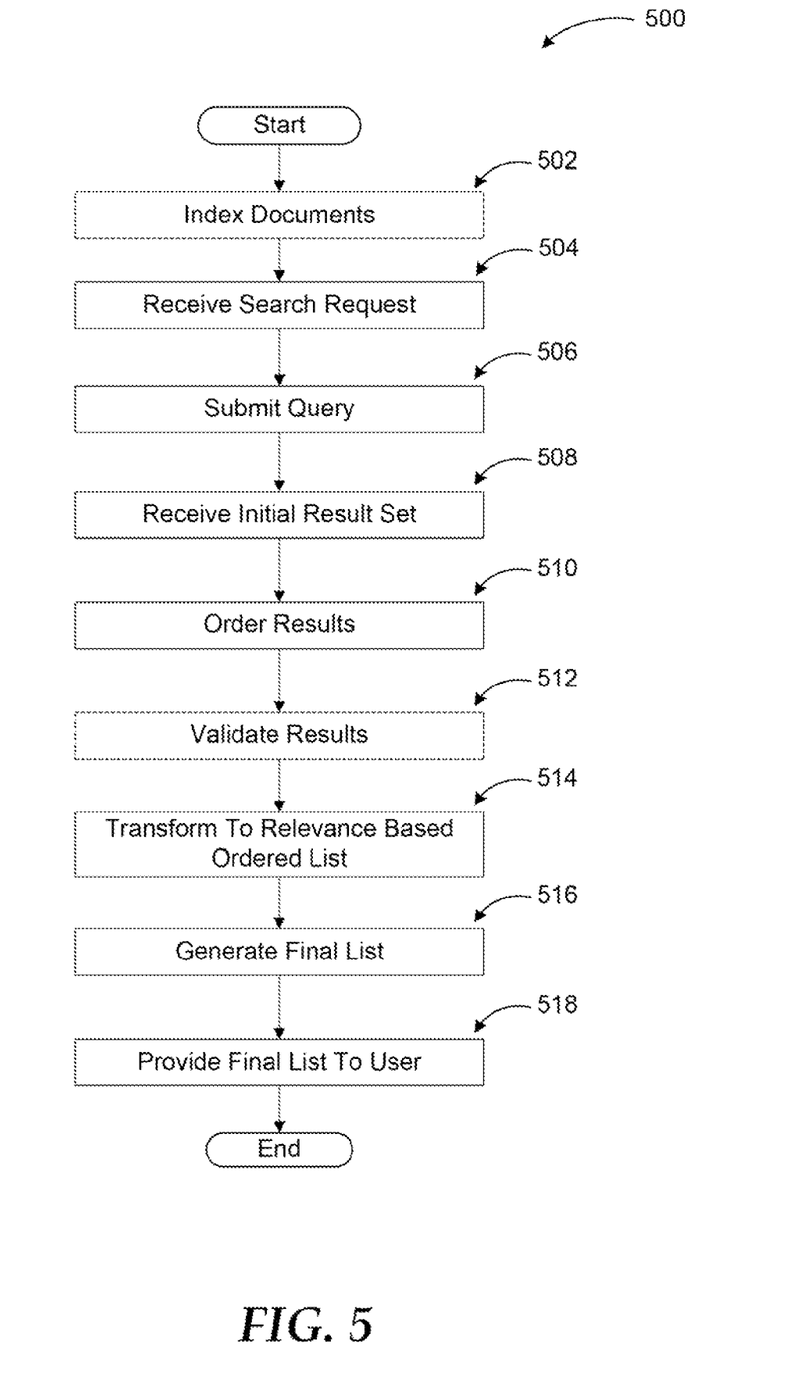
FIG. 5 illustrates a logic flow diagram of a multilingual document search process with filtering and ordering capabilities according to embodiments.

FIG. 5 illustrates a logic flow diagram of a multilingual document search process with filtering and ordering capabilities according to embodiments. Process 500 may be implemented as part of a document search service.

Process 500 begins with optional operation 502, where documents are indexed in a global search engine index using an identifier property and a language property permitting all relevant documents to be retrieved in a single search engine query. The indexing of the documents based on their identifier and language properties is a separate process from the querying process. The querying process is performed on already indexed documents. Processing advances from optional operation 502 to operation 504.

At operation 504, a search request is received from a user. Along with the request the user's preferences for language may also be received. Processing continues to operation 506 from operation 504.

At operation 506, a query based on the user's search request is submitted to one or more data stores, where documents of interest may be stored. Processing moves to operation 508 from operation 506.

At operation 508, an initial result set is received. The results of the initial search may include a multilingual set of documents ranked in order of relevance. Processing moves to operation 510 from operation 508.

At operation 510, the initial result set is processed using a data resource indicating for each MUI combination, which language version of each document should be returned. Processing moves to optional operation 512 from operation 510.

At optional operation 512, the search results are validated against the document store to ensure that there are no discrepancies between the search index and the documents stored in service platform document store. During this validation, the documents that are returned as relevant may be validated regardless of their culture. Processing advances from optional operation 512 to operation 514.

At operation 514, the initial search result is transformed into a relevance based ordered list. While generating this list, documents in different languages having same content may be considered equivalent. Processing moves to operation 516 from operation 514.

At operation 516, a final document list is prepared based on the ordered list using the localized and non-localized content. Processing moves to operation 518 from operation 516.

At operation 518, the final document list is provided to the user. The list may be provided by displaying on a display device, printing, storing in a predefined data store, transmitting via electronic mail, and the like. After operation 518, processing moves to a calling process for further actions.

The operations included in process 500 are for illustration purposes. Multilingual document search based on user language preferences may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for searching multilingual documents, the method comprising:
   on the computing device, receiving a search result set ranked in order of relevance in response to submitting a query based on a request from a user for documents, the submitted query including a list of languages from which the received search result set is filtered, the documents being indexed in a search engine index, each document in the search engine index including an identifier property and a language property, the identifier property identifying the document and the language property specifying a language version for the document, each document in the received search result set including an identifier property and a language property, the identifier property for each document in the received search result set identifying the document and the language property for each document in the received search result set specifying the language version for the document;
   determining which language version of each document in the received search result set is returned based on the list of languages included in the submitted query;
   processing the received search result set based on the determination;
   transforming the processed search result set into a relevance based ordered list;
   generating a final list based on the relevance based ordered list using localized and non-localized content of the documents, the generated final list including at least one localized document having a higher position in the generated final list than a non-localized document ranked higher in the order of relevance than the at least one localized document in the received search result set, the at least one localized document having a language property for a local language from the list of languages included in the submitted query, and the non-localized document having a language property for a non-local language from the list of languages included in the submitted query; and
   providing the generated final list to the user.

2. The method of claim 1, wherein the processing the received search result set includes one of deprioritizing and eliminating documents in the received search result set based on a user language preference.

3. The method of claim 2, wherein the user language preference includes a primary language selection and at least one other lower ranked language selection.

4. The method of claim 1, wherein the processing the received search result set further includes one of de-prioritizing and eliminating documents in the received search result set based on a user credential.

5. The method of claim 1, further comprising:
   prior to generating the final list, validating the documents in the received search result set against a global search index.

6. The method of claim 5, wherein the documents are validated independent of their culture such that a higher ranked non-localized document is replaced by its localized counterpart.

7. The method of claim 1, wherein the transforming the processed search result set into the relevance based ordered list includes treating documents in different languages having same content as equivalent.

8. A system for searching multilingual documents, the system comprising:
   a memory;
   a processor coupled to the memory, wherein the processor is configured to execute program modules including:
      a global search index module that maintains a list of available documents based on a document identifier property and a document language property;
      a search engine configured to:
         submit a query based on a request from a user for documents, the submitted query including a list of languages from which search results are filtered, the documents being indexed in a search engine index of the search engine, each document in the search engine index including an identifier property and a language property, the identifier property identifying the document and the language property specifying a language version for the document;
         receive search results ranked in order of relevance, the received search results including a plurality of documents, each document in the received search results including an identifier property and a language property, the identifier property for each document in the received search results identifying the document and the language property for each document in the received search results specifying a language version for the document;
         determine which language version of each document in the received search results is returned based on the list of languages included in the submitted query;
         de-prioritize documents in the received search results based on the determination;
         transform the received search results into a relevance based ordered list;
         generate a final list based on the relevance based ordered list using localized and non-localized content of the documents, the generated final list including at least one localized document having a higher position in the generated final list than a non-localized document ranked higher in the order of relevance than the at least one localized document in the received search result set, the at least one localized document having a language property for a local language from the list of languages included in the submitted query, and the non-localized document having a language property for a non-local language from the list of languages included in the submitted query; and provide the generated final list to the user.

9. The system of claim 8, wherein the search engine is further configured to:

limit the documents in the received search results to those in languages of a desired multilingual user interface (MUI) by filtering on the list of languages included in the submitted query.

10. The system of claim 8, wherein the search engine is further configured to submit the query to and receive search results from a plurality of data sources.

11. The system of claim 8, wherein the search engine is further configured to employ a fallback approach such that a non-localized document is returned if a localized counterpart is not available.

12. The system of claim 11, wherein the fallback approach is based on one of: a random ordering and a predefined order.

13. The system of claim 8, wherein the generated final list is generated based on a primary language selection and at least one other lower ranked language selection from a user language preference.

14. The system of claim 13, wherein the global search index module is associated with at least one data store that stores a portion of the indexed documents.

15. A computer-readable storage medium with instructions encoded thereon for searching multilingual documents, the instructions comprising:

receiving a search request from a user;

submitting a query based on the received request for documents, wherein a list of available documents is maintained in a local search index based on a document identifier property and a document language property;

receiving a search result set ranked in order of relevance, the received search result set including a plurality of documents, each document in the received search result set including an identifier property and a language property, the identifier property for each document in the received search result set identifying the document and the language property for each document in the received search result set specifying a language version for the document;

determining which language version of each document in the received search result set is returned based on a user language preference;

processing the received search result set based on the determination and the local search index;

limiting the documents in the received search result set to those in languages of a desired multilingual user interface (MUI) by filtering on a list of localizations specified at query time;

transforming the processed received search result set into a relevance based ordered list;

generating a final list based on the relevance based ordered list using localized and non-localized content of the documents, the generated final list including at least one localized document having a higher position in the generated final list than a non-localized document ranked higher in the order of relevance than the at least one localized document in the received search result set, the at least one localized document having a language property for a local language, and the non-localized document having a language property for a non-local language; and providing the generated final list to the user.

16. The computer-readable storage medium of claim 15, wherein the processing the received search result set includes one of de-prioritizing and eliminating documents in the received search result set based on the user language preference.

17. The computer-readable storage medium of claim 15, wherein the instructions further comprise:

validating the documents in the received search result set against the local search index independent of their culture such that a higher ranked non-localized document is replaced by its localized counterpart.

18. The computer-readable storage medium of claim 15, wherein the instructions further comprise:

submitting the submitted query to a plurality of data sources; and combining the result sets from the plurality of data sources.

19. The computer-readable storage medium of claim 15, wherein the instructions further comprise:

updating the local search index based on at least one of: an expiration of a predefined period and after a predefined number of search requests.

* * * * *